(12) United States Patent
Tomcik et al.

(10) Patent No.: US 6,567,388 B1
(45) Date of Patent: May 20, 2003

(54) METHOD AND APPARATUS FOR EFFICIENT DATA RETRANSMISSION IN A VOICE-OVER-DATA COMMUNICATION SYSTEM

(75) Inventors: James Tomcik, Carlsbad, CA (US); Yu-Dong Yao, San Diego, CA (US)

(73) Assignee: Qualcomm, Incorporated, San Diego, CA (US)

(*) Notice: Subject to any disclaimer, the term of this patent is extended or adjusted under 35 U.S.C. 154(b) by 0 days.

(21) Appl. No.: 09/264,220

(22) Filed: Mar. 5, 1999

(51) Int. Cl.⁷ .......................... H04B 7/216; H04L 1/00
(52) U.S. Cl. .................. 370/335; 370/342; 714/748
(58) Field of Search ................. 370/335, 342, 370/277, 278, 479, 356, 394, 428, 495; 714/746, 748, 749

(56) References Cited

U.S. PATENT DOCUMENTS

| | | | |
|---|---|---|---|
| 4,439,859 A | | 3/1984 | Donnan ................. 371/32 |
| 4,617,657 A | | 10/1986 | Drynan et al. ............ 370/60 |
| 5,596,318 A | * | 1/1997 | Mitchell ............... 370/394 |
| 5,642,354 A | * | 6/1997 | Spear .................. 370/329 |
| 5,721,733 A | * | 2/1998 | Wang et al. ............ 370/332 |
| 5,768,527 A | * | 6/1998 | Zhu et al. ............. 370/231 |
| 5,949,773 A | * | 9/1999 | Bhalla et al. .......... 370/331 |
| 5,956,729 A | * | 9/1999 | Goetz et al. ........... 707/104 |
| 6,011,796 A | * | 1/2000 | Rezaiifar et al. ....... 370/394 |
| 6,076,181 A | * | 6/2000 | Cheng ................. 714/748 |
| 6,160,639 A | * | 12/2000 | Lutgen et al. .......... 358/442 |
| 6,167,270 A | * | 12/2000 | Rezaiifar et al. ....... 370/331 |

OTHER PUBLICATIONS

TIA/EIA Interim Standard. Data Services Option Standard for Wideband Spread Spectrum Digital Cellular System. TIA/EIA/IS–99. Telecommunications Industry Association, Jul. 1995.

* cited by examiner

*Primary Examiner*—Chau Nguyen
*Assistant Examiner*—Soon-Dong Hyun
(74) *Attorney, Agent, or Firm*—Philip R. Wadsworth; Gregory D. Ogrod; Thomas M. Thibault

(57) ABSTRACT

A method and apparatus for efficient data retransmission in a voice-over-data communication system between a first wireless communication device and a second wireless communication device, without affecting existing infrastructure. When a data frame containing audio information is received in error by the first wireless communication device, n negative-acknowledgement messages are sent from the first wireless communication device to the second wireless communication device which sent the frame, each of the negative acknowledgement messages transmitted in close succession to each other. When a negative-acknowledgement message is received by the first wireless communication device from the second wireless communication device, n copies of the frame identified by the negative-acknowledgement message is transmitted by the first wireless communication device, each of the copies transmitted in close succession to each other.

24 Claims, 3 Drawing Sheets

METHOD AND APPARATUS FOR EFFICIENT DATA RETRANSMISSION IN A VOICE-OVER-DATA COMMUNICATION SYSTEM

BACKGROUND OF THE INVENTION

I. Field of the Invention

The present invention pertains generally to the field of wireless communications, and more specifically to providing an efficient method and apparatus for retransmitting data frames in a voice-over-data communication system.

II. Background

The field of wireless communications has many applications including cordless telephones, paging, wireless local loops, and satellite communication systems. A particularly important application is cellular telephone systems for mobile subscribers. (As used herein, the term "cellular" systems encompasses both cellular and PCS frequencies.) Various over-the-air interfaces have been developed for such cellular telephone systems including frequency division multiple access (FDMA), time division multiple access (TDMA), and code division multiple access (CDMA). In connection therewith, various domestic and international standards have been established including Advanced Mobile Phone Service (AMPS), Global System for Mobile (GSM), and Interim Standard 95 (IS-95). In particular, IS-95 and its derivatives, such as IS-95A, IS-95B (often referred to collectively herein as IS-95), ANSI J-STD-008, (IS-99, IS-657, IS-707, and others, are promulgated by the Telecommunication Industry Association (TIA) and other well known standards bodies.

Cellular telephone systems configured in accordance with the use of the IS-95 standard employ CDMA signal processing techniques to provide highly efficient and robust cellular telephone service. An exemplary cellular telephone system configured substantially in accordance with the use of the IS-95 standard is described in U.S. Pat. No. 5,103,459 entitled "System and Method for Generating Signal Waveforms in a CDMA Cellular Telephone System", which is assigned to the assignee of the present invention and incorporated herein by reference. The aforesaid patent illustrates transmit, or forward-link, signal processing in a CDMA base station. Exemplary receive, or reverse-link, signal processing in a CDMA base station is described in U.S. application Ser. No. 08/987,172, filed Dec. 9, 1997, entitled MULTI-CHANNEL DEMODULATOR, which is assigned to the assignee of the present invention and incorporated herein by reference. In CDMA systems, over-the-air power control is a vital issue. An exemplary method of power control in a CDMA system is described in U.S. Pat. No. 5,056,109 entitled "Method and Apparatus for Controlling Transmission Power in A CDMA Cellular Mobile Telephone System" which is assigned to the assignee of the present invention and incorporated herein by reference.

A primary benefit of using a CDMA over-the-air interface is that communications are conducted simultaneously over the same RF band. For example, each mobile subscriber unit (typically a cellular telephone) in a given cellular telephone system can communicate with the same base station by transmitting a reverse-link signal over the same 1.25 MHz of RF spectrum. Similarly, each base station in such a system can communicate with mobile units by transmitting a forward-link signal over another 1.25 MHz of RF spectrum.

Transmitting signals over the same RF spectrum provides various benefits including an increase in the frequency reuse of a cellular telephone system and the ability to conduct soft handoff between two or more base stations. Increased frequency reuse allows a greater number of calls to be conducted over a given amount of spectrum. Soft handoff is a robust method of transitioning a mobile unit between the coverage area of two or more base stations that involves simultaneously interfacing with two or more base stations. (In contrast, hard handoff involves terminating the interface with a first base station before establishing the interface with a second base station.) An exemplary method of performing soft handoff is described in U.S. Pat. No. 5,267,261 entitled "Mobile Station Assisted Soft Handoff in a CDMA Cellular Communications System" which is assigned to the assignee of the present invention and incorporated herein by reference.

Under the IS-99 and IS-657 standards (referred to hereinafter collectively as IS-707), an IS-95-compliant communications system can provide both voice and data communications services. Data communications services allow digital data to be exchanged between a transmitter and one or more receivers over a wireless interface. Examples of the type of digital data typically transmitted using the IS-707 standard include computer files and electronic mail.

In accordance with both the IS-95 and IS-707 standards, the data exchanged between a transmitter and a receiver is processed in frames, or predefined time periods. To increase the likelihood that a frame will be successfully transmitted during a data transmission, IS-707 employs a radio link protocol (RLP) to track the frames transmitted successfully and to perform frame retransmission when a frame is not transmitted successfully. Retransmission is performed up to three times in IS-707, and it is the responsibility of the higher layer protocols to take additional steps to ensure that the frame was received successfully.

In order to track which frames have been received successfully, IS-707 uses an eight-bit sequence number to be included as a frame header in each frame transmitted. The sequence number is incremented for each frame from 0 to 256 and then reset back to zero. An unsuccessfully transmitted frame is detected when a frame with an out-of-order sequence number is received, or an error is detected using CRC checksum information or other error detection methods. Once an unsuccessfully received frame is detected, the receiver transmits a negative-acknowledgment message (NAK) to the transmit system that includes the sequence number of the frame that was not received. The transmit system then retransmits the frame including the sequence number as originally transmitted. If the retransmitted frame is not received successfully, a second retransmission request, consisting of two NAKs, is sent to the transmit system, this time requesting that the frame be transmitted twice. If the frame is still not received successfully, a third retransmission request, consisting of three NAKs, is sent to the transmit system, this time requesting that the frame be transmitted three times. If the frame is still not received successfully after the third retransmission request, no further retransmissions are requested, and the frame is ignored at the receiver for use in reconstructing the original data.

Recently, a need has arisen for transmitting voice information using the data protocols of IS-707. For example, in a secure communications system, voice information which is manipulated by encryption algorithms may be more easily transmitted using a data protocol. In such applications, it is desirable to maintain the use of existing data protocols so that no changes to existing infrastructure are necessary. However, problems occur when transmitting voice using a data protocol, due to the nature of voice characteristics.

One of the primary problems of transmitting audio information, such as voice, using a data protocol is the delays associated with frame retransmissions. Delays of more than a few hundred milliseconds in speech can result in unacceptable voice quality. When transmitting audio-based data, time delays are easily tolerated due to the non real-time nature of data. As a consequence, the protocols of IS-707 can afford to use the frame retransmission scheme as described above, which may result in transmission delays, or a latency period, of more than a few seconds. Such a latency period is unacceptable for transmitting voice information.

Another disadvantage of transmitting audio information using data protocols is that present mobile communication devices are constrained by the way in which they must respond to retransmission requests from, for example, a base station. Presently, a mobile communication device must follow frame retransmission requests from a base station in accordance with IS-707. For example, if frame number 11 was not received correctly by a base station, the base station will send a single NAK to the mobile communication device, requesting a single retransmission of frame 11. In accordance with IS-707, the mobile communication device must respond with a single retransmission of frame 11. If the re-transmitted frame is still not received by the base station, two NAKs are sent to the mobile communication device requesting that frame 11 be re-transmitted twice. The mobile communication device then responds by transmitting frame 11 twice. In certain situations, it would be desirable for the mobile communication device to respond to NAKs in a more intelligent manner.

A related disadvantage of using data protocols to transmit voice information is that base stations are likewise restrained in their ability to respond to NAKs sent by mobile communication devices. Base stations designed for use in IS-95 compliant communication systems can only send one copy of a requested frame for each NAK received. It would be desirable to allow a base station to also respond in a more intelligent manner to NAKs.

What is needed is a method and apparatus for re-transmitting frames received in error, while minimizing the problems caused by the time delays associated with the retransmissions. Furthermore, the retransmission method and apparatus should be backwards-compatible with existing infrastructure to avoid expensive upgrades to those systems.

SUMMARY OF THE INVENTION

The present invention is a method and apparatus for re-transmitting data frames containing audio information over an existing data network. The present invention resides entirely within a mobile communication device so that expensive modifications to existing infrastructure can be avoided.

When a frame is received in error by a first wireless communication device, a number of negative-acknowledgement messages (NAKs) are sent from the first wireless communication device to a transmitter which sent the frame, each of the negative acknowledgement messages transmitted in close succession to each other. The NAKs direct the transmitter, located within a second wireless communication device, generally a base station, to transmit multiple copies of the frame which was received in error, thereby increasing the probability that the frame will be correctly received within a short amount of time. Thus, the audio latency is reduced. Alternatively, when a frame is received in error by the first wireless communication device, the first wireless communication device ignores the error and does not transmit any NAKs. This degrades voice quality only slightly, but significantly reduces voice latency by avoiding the retransmission process altogether.

When a NAK is generated and transmitted by the second wireless communication device and received by the first wireless communication device, a number of copies of the frame identified by the NAK is transmitted by the first wireless communication device, each of the copies transmitted in close succession to each other. Again, the probability of a frame being successfully received is increased using multiple frame re-transmissions. Alternatively, when a single NAK is received by the first wireless communication device, the number of copies are transmitted in two stages. One copy of the identified frame is transmitted immediately upon receiving the single NAK. The remaining copies are transmitted only if and when no new data is available to be transmitted.

DETAILED DESCRIPTION OF THE PREFERRED EMBODIMENTS

The embodiments described herein are described with respect to a wireless communication system operating in accordance with the use of CDMA signal processing techniques of the IS-707 and IS-95 standards. While the present invention is especially suited for use within such a communications system, it should be understood that the present invention may be employed in various other types of communications systems that transmit data via frames or packets, including both wireless and wireline communication systems, and satellite-based communication systems. Additionally, throughout the description, various well-known systems are set forth in block form. This is done for the purpose of clarity.

Various wireless communication systems employ fixed base stations that communicate with mobile units using an over-the-air interface. Such wireless communication systems include AMPS (analog), IS-54 (North American TDMA), GSM (Global System for Mobile communications TDMA), and IS-95 (CDMA). In a preferred embodiment, the wireless communication system is a CDMA system.

Figure 1:
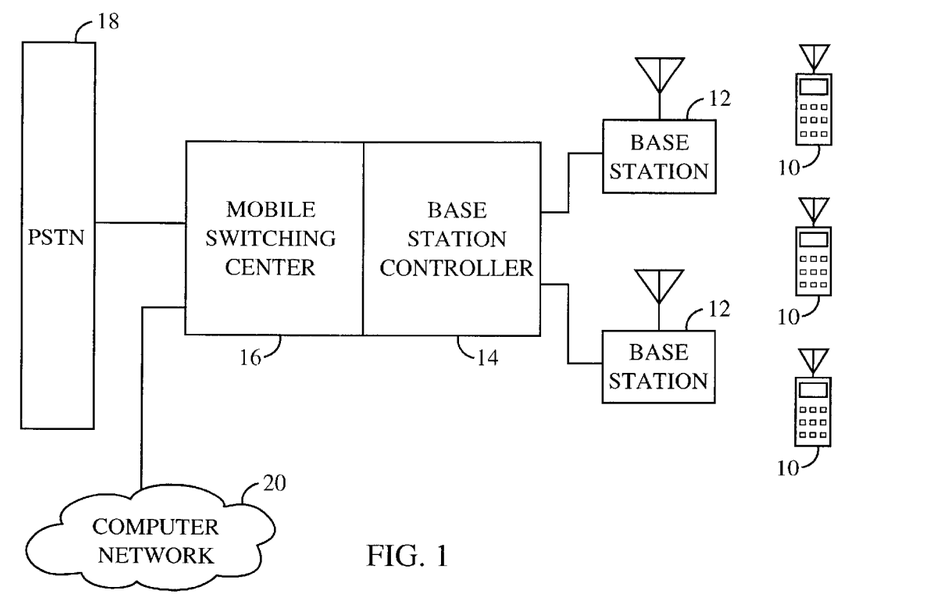
FIG. 1 is a block diagram of a wireless communication system.

As illustrated in FIG. 1, a CDMA wireless communication system generally includes a plurality of first wireless communication devices 10, a plurality of second wireless communication devices, or base stations, 12, a base station controller (BSC) 14, and a mobile switching center (MSC) 16. A first wireless communication device 10 is typically a wireless telephone, although wireless communication device 10 could also comprise a computer equipped with a wireless modem, or any other device capable of transmitting and receiving audio or data information to another wireless communication device. Second wireless communication device 12, while shown in FIG. 1 as a fixed base station, might alternatively comprise a mobile communication device, a satellite, or any other device capable of transmitting and receiving communications from first wireless communication device 10. For purposes of clarity, first wireless communication device 10 shall be referred to herein as mobile unit 10, and second wireless communication device 12 shall be referred to as base station 12.

The MSC 16 is configured to interface with a conventional public switch telephone network (PSTN) 18 or directly to a computer network, such as Internet 20. The MSC 16 is also configured to interface with the BSC 14. The BSC 14 is coupled to each base station 12 via backhaul lines. The backhaul lines may be configured in accordance with any of several known interfaces including E1/T1, ATM, or IP. It is to be understood that there can be more than one BSC 14 in the system. Each base station 12 advantageously includes at least one sector (not shown), each sector comprising an antenna pointed in a particular direction radially away from the base station 12. Alternatively, each sector may comprise two antennas for diversity reception. Each base station 12 may advantageously be designed to support a plurality of frequency assignments (each frequency assignment comprising 1.25 MHz of spectrum). The intersection of a sector and a frequency assignment may be referred to as a CDMA channel. The base stations 12 may also be known as base station transceiver subsystems (BTSs) 12. Alternatively, "base station" may be used in, the industry to refer collectively to a BSC 14 and one or more BTSs 12, which BTSs 12 may also be denoted "cell sites" 12. (Alternatively, individual sectors of a given BTS 12 may be referred to as cell sites.) The mobile subscriber units 10 are typically wireless telephones 10, and the wireless communication system is advantageously a CDMA system configured for use in accordance with the IS-95 standard.

During typical operation of the cellular telephone system, base stations 12 receive sets of reverse-link signals from sets of mobile units 10. The mobile units 10 transmit and receive voice and/or data communications. Each reverse-link signal received by a given base station 12 is processed within that base station 12. The resulting data is forwarded to BSC 14. BSC 14 provides call resource allocation and mobility management functionality including the orchestration of soft handoffs between base stations 12. BSC 14 also routes the received data to MSC 16, which provides additional routing services for interface with PSTN 18. Similarly, PSTN 18 and internet 20 interface with MSC 16, and MSC 16 interfaces with BSC 14, which in turn controls the base stations 12 to transmit sets of forward-link signals to sets of mobile units 10.

In accordance with the teachings of IS-95, the wireless communication system of FIG. 1 is generally designed to permit voice communications between mobile units 10 and to wireline communication devices through PSTN 18. However, various standards have been implemented, including, for example, IS-707, which permit the transmission of data between mobile subscriber units 10 and data communication devices through either PSTN 18 or Internet 20. Examples of applications which require the transmission of data instead of voice include email, various downloadable applications, and paging services. IS-707 specifies how data is to be transmitted between a transmitter and a receiver operating in a CDMA communication system.

The protocols contained within IS-707 to transmit data are different than the protocols used to transmit audio information, as specified in IS-95, due to the properties associated with each data type. For example, the permissible error rate while transmitting audio information can be relatively high, due to the limitations of the human ear. A typical permissible frame error rate in an IS-95 compliant CDMA communication system is one percent, meaning that one percent of the frames can be received in error without a perceptible loss in audio quality.

In a data communication system, the error rate must be much lower than in a voice communication system, because a single data bit received in error can have a significant effect on the information being transmitted. A typical error rate in such a data communication system, specified as a Bit Error Rate (BER) is on the order of $10^{-9}$, or one bit received in error for every billion bits received.

In an IS-707 compliant data communication system, information is transmitted in 20 millisecond frames. When a frame is received having one or more errors contained in the frame, a negative-acknowledgement message, or NAK, is transmitted to the transmitter from which the data frame was sent, informing the transmitter of a frame number associated with the frame which was received in error. A frame which has been received in error is also known as an error frame or a bad frame, and can be defined as a received frame containing errors or a frame which was never received by an intended receiver. When the transmitter receives the NAK, a duplicate copy of the data frame is retrieved from a memory buffer and is then re-transmitted to the receiver.

In accordance with the teachings of IS-707, if the same frame is not successfully received within a predetermined amount of time after sending the initial NAK, a second request is sent to the transmitter in the form of two NAKs, each NAK specifying that the same frame be re-transmitted, one retransmission for each NAK sent. The purpose of multiple NAKs is to increase the probability of successfully receiving a frame.

If the data frame is still not received within a second predetermined amount of time from when the second retransmission request was sent, a third retransmission request is sent by the receiver in the form of three NAKs, each NAK specifying that the same frame be re-transmitted, one retransmission for each NAK sent. If the frame is still not received within a third predetermined amount of time from when the third retransmission request was sent, no further retransmission requests are sent and the frame is ignored at the receiver for use in reconstructing the original data. The original predetermined time period for response, the second predetermined time, and the third predetermined time may be equal to one another, or they may be set to different values. In addition, the three predetermined time periods may be dynamically adjustable, depending on the transmission quality of the channel. This may be measured by monitoring the error rate at which data is received.

The retransmission scheme just described introduces a time delay in correctly receiving a frame which has initially been received in error. The time delay is caused by the multiple requests for frame retransmission and the time spent by the receiver waiting to see if a first, second, or third retransmission request has succeeded. Usually, this time delay does not have an adverse effect when transmitting data. However, when transmitting audio information over a data communication system, the time delay associated with retransmission requests is unacceptable, as it introduces a noticeable loss of audio quality to listeners.

The present invention allows a mobile unit 10 to request retransmissions in a manner which is compatible with existing infrastructure and data transmission protocols while minimizing the time delay associated with retransmission requests. In addition, the present invention allows a mobile unit 10 to respond to retransmission requests in a manner which reduces the retransmission time delay.

Figure 2:
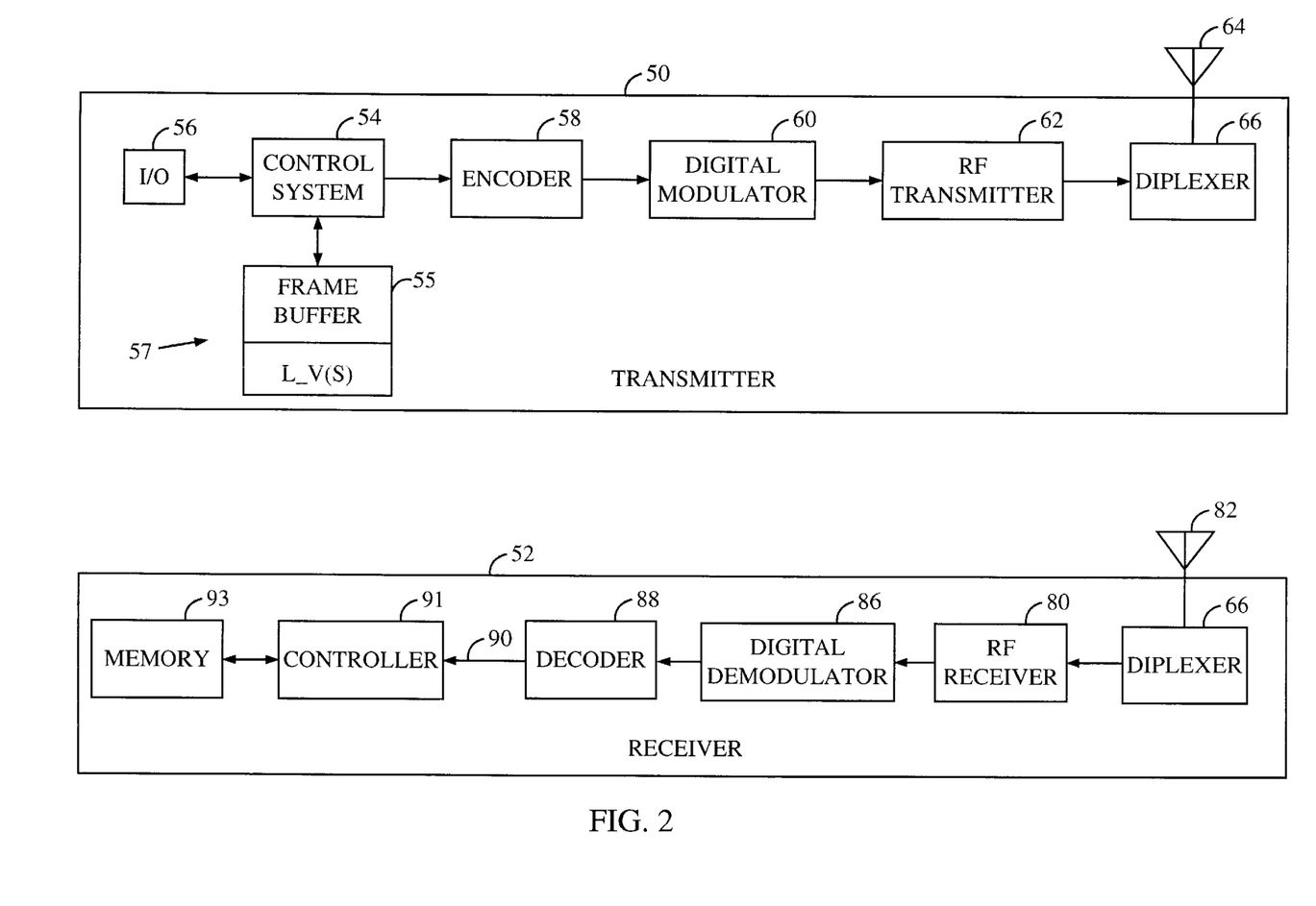
FIG. 2 illustrates a block diagram of a transmitter and a receiver used in the wireless communication system of FIG. 1.

FIG. 2 illustrates a transmitter and a receiver configured in accordance with an exemplary embodiment in block form. Communications take place between transmitter 50 and receiver 52. In most wireless communication systems, at least one transmitter 50 and one receiver 52, together known as a modem, are located in a base station (BTS) 12, and one transmitter 50 and one receiver 52 is located within a mobile unit 10 to permit two-way communications between the BTS 12 and the mobile unit 10. The following discussion describes the present invention in terms of a forward link, that is, data transmission from BTS 12 to mobile unit 10. Therefore, any reference to transmitter 50 is directed to the transmitter located within BTS 12 and any reference to receiver 52 is directed to the receiver located within mobile unit 10, unless otherwise noted. A discussion of the present invention with respect to the reverse link follows the discussion of the present invention with respect to the forward link.

The present invention resides completely within mobile unit 10, thereby eliminating the need to perform expensive and undesirable changes to existing infrastructure equipment. In addition, the present invention is implemented without requiring modifications to existing voice and data protocols mandated by industry standards, such as IS-95 and IS-707.

Referring now back to FIG. 2, in transmitter 50, control system 54 receives data frames from input/output (I/O) 56 and provides the data frames to encoder 58. Control system 54 represents a well known digital computational device capable of controlling frame information to and from I/O 56, as well as a multitude of other functions within transmitter 50. The data frames can either comprise audio information or data, however, the present invention is used primarily to transmit data frames containing audio information. Encoder 58 performs convolutional encoding, generating code symbols that are received by digital modulator 60. Digital modulator 60 performs direct sequence modulation on the code symbols with one or more binary channel codes and one or more binary spreading codes, yielding chipped symbols that are received by radio frequency (RF) transmitter 62. The chipped symbols are upconverted to the carrier frequency band by RF transmitter 62 and transmitted from antenna system 64 via diplexer 66.

Various methods and apparatus for performing the digital modulation and RF upconversion can be employed. A set of particularly useful methods and apparatus are described in copending U.S. applications Ser. Nos. 08/431,180, entitled METHOD AND APPARATUS FOR PROVIDING VARIABLE RATE DATA IN A COMMUNICATIONS SYSTEM USING STATISTICAL MULTIPLEXING, filed Apr. 28, 1995; 08/395,960, entitled METHOD AND APPARATUS FOR PROVIDING VARIABLE RATE DATA IN A COMMUNICATIONS SYSTEMS USING NON-ORTHOGONAL OVERFLOW CHANNELS, filed Feb. 28, 1995; and 08/784,281, entitled HIGH DATA RATE SUPPLEMENTAL CHANNEL FOR CDMA TELECOMMUNICATIONS SYSTEM, filed Jan. 15, 1997; each of which is assigned to the assignee of the present invention and incorporated herein by reference. It should be understood that some of the above-referenced patent applications are directed to the forward link, and are therefore more suited for use with the transmitter 50, while others are directed to the reverse link, and are therefore more suited for use with the receiver 52.

Figure 3:
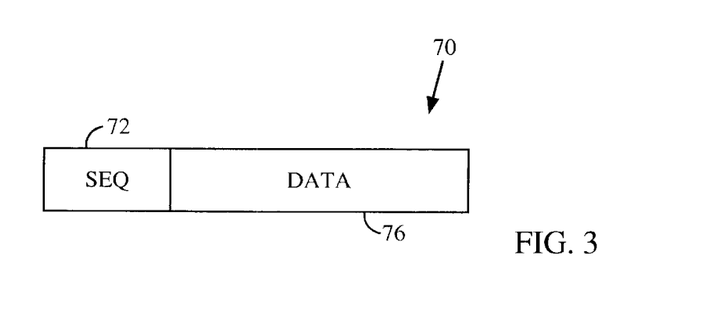
FIG. 3 illustrates a typical frame generated by the transmitter of FIG. 2.

FIG. 3 illustrates an exemplary data frame 70 transmitted from antenna system 64, which includes an eight-bit sequence field (SEQ number) 72 and a data field 76. Frame 70 may include other fields, as is well known in the art, that are not shown because they are not particularly relevant to the present invention. In a preferred embodiment, the frames are formatted substantially in accordance with the frame structures defined in the IS-707 standard.

Referring back to FIG. 2, data frames are provided to encoder 58 in an orderly manner using control system 54, which stores the frames within frame buffer 55 and updates an index value L_V(S), both of which are stored in memory 57. In a preferred embodiment, index value L_V(S) is a twelve-bit sequence number that is incremented after each frame is placed into buffer 55. The least significant eight bits of index value L_V(S) are placed in the sequence field 72 of frame 70 as frames are stored in buffer 55.

At receiver 52, RF signals from transmitter 50 are received by antenna 82, then routed to RF receiver 80 by diplexer 66. Digital demodulator 86 demodulates the downconverted, or "baseband," signals using the necessary binary codes, generating soft decision data that is received by decoder 88. Decoder 88 performs maximum likelihood trellis, or Viterbi, decoding, yielding hard decision data 90 that is provided to controller 91.

Controller 91 reforms frame 70 using hard decision data 90 and determines whether the frame has been received in sequence relative to the frames that have already been received using techniques well known in the art. Controller 91 represents any well known digital computational device which is capable of controlling the overall functionality of receiver 52. The data contained in data field 76 is also checked to determine if it has been received without error, generally using a conventional CRC error-checking format, which is also well known in the art. If frame 70 has been received out of sequence or received in the proper sequence but data field 76 nevertheless was received in error, a retransmission request in accordance with the teachings of the present invention is generated by controller 91 and sent to transmitter 50 requesting at least one retransmission of the frame which was received in error. For the remaining discussion herein, a frame is considered to have been received in error if an out of sequence frame is detected, or if a frame is received, but the data contained in data field 76 is not usable.

In a first embodiment of the present invention, controller 91 immediately generates a fixed number, n, of NAKs, which are sent to transmitter 50 requesting multiple retransmissions of frame 70. In a preferred embodiment, the number, n, of NAKs sent by controller 91 is equal to three, although a greater or lesser number of NAKs could be sent in alternative embodiments. Each NAK generated contains information which identifies the particular frame that was not received correctly, for example, SEQ number 72 corresponding to the frame 70 received in error.

The multiple NAKs are transmitted in close succession to each other. This may be accomplished by either transmitting NAKs in immediate succession or by interleaving NAKs with normal data frames. Alternatively, NAKs pertaining to different frames may be interleaved with each other, thereby allowing for a brief time period in-between NAKs pertaining to the same frame. Increased reliability is achieved by spacing NAKs pertaining to the same frame apart from one another, creating time diversity between NAKs.

In a slight variation of interleaving NAKs with normal data frames, multiple NAKs are retransmitted in a two step process. In the first step, a first NAK identifying a frame received in error is inserted into the stream of frames awaiting transmission, otherwise known as a transmission stream. The first NAK displaces what would be the next normal data frame to be transmitted. As such, the normal data frames are delayed by one frame. Second and subsequent NAKs relating to the same error frame are only inserted into the transmission stream if an empty time slot becomes available, that is, if no normal data frames are immediately present for placement into the transmission stream. Generally, if no empty time slot occurs for a predetermined time period after the first NAK was transmitted, no further NAKs are transmitted relating to the particular error frame. Control system 54 determines if any empty time slots are available.

At transmitter 50, the multiple NAKs are received in a manner similar to reception at receiver 52. Control system 54 determines if a NAK has been received, and if so, the identified frame(s) are re-transmitted in accordance with the teachings of the data protocol being used, in this case, IS-707. That is, one frame retransmission occurs for every NAK received. In the preferred embodiment, three retransmissions of a frame identified in the NAKs are sent to receiver 52. The timing of the re-transmitted frames generally follow the timing of the received NAKs. For example, if multiple NAKs are received in immediate succession, the same number of retransmissions occur in immediate succession. If NAKs are received having a time delay in between each NAK, the re-transmitted frames are sent having generally the same time delay inserted therebetween.

In a second embodiment of the present invention, the number of NAKs generated in response to an error frame, n, varies, depending on the transmission quality of the channel over which communications take place. One way to measure the channel quality is to measure the rate at which NAKs are generated. The second embodiment allows mobile unit 10 to vary the number of retransmission requests, n, depending on the likelihood of successfully receiving a frame which was received in error. Once a NAK rate is determined, the number of NAKs generated each time a frame is received in error, n, can then be calculated and used in further retransmission requests.

The NAK rate can be defined as the number of NAKs transmitted or received by a wireless communication device or by a fixed station with respect to a predetermined number of frames transmitted or received. It could also be defined as the number of NAKs generated, but not yet transmitted. Although the NAK rate could be determined in one of a number of different ways, three methods are discussed herein.

The first method of determining the NAK rate is to simply divide the number of NAKs transmitted by a predetermined number of frames received. In this approach, a variable is stored in memory 93 which is incremented for each NAK transmitted. A second variable stored in memory 93 is incremented for every frame received. When a predetermined number of frames have been received, for instance 100 frames, the number of NAKs transmitted to that point is divided by the number of predetermined frames to determine the NAK rate. This method of determining the NAK rate is updated one time for each predetermined number of frames received. When the predetermined number of frames has been received, the number of NAKs transmitted and the number of frames received is set to zero in memory 93 and the process begins once again.

The second method of determining the NAK rate is to use a "sliding window" approach. That is, a new NAK rate is determined for every frame received, as follows. A window is defined as a predetermined number of frames received, for example, 100 frames. Memory 93 is then used to track the number of NAKs transmitted during the previous window, in this example, during the previous 100 frames received. When a new frame is received, the total number of NAKs transmitted over the last window, including the new frame, is evaluated by controller 91. In this way, a new NAK rate is determined for every frame received.

The third method for determining the NAK rate is to use an incremental approach. In this embodiment, the current NAK rate is calculated based upon the previous NAK rate and the status of the current frame received. As frames are received, they are evaluated to determine if the frame was received without error. Frames which are received in error increase the NAK rate by an increment, while frames received correctly decrease the NAK rate by an equal increment. The increment can be any predetermined number, in the exemplary embodiment, the NAK rate is incremented by one one-hundredth. This method can be described by the following equation:

$$\text{Current } NAK \text{ rate} = \frac{(N-1)(\text{Previous } NAK \text{ rate}) + \text{Current Frame Status (either 1 or 0)}}{N}$$

where 1/N is equal to the predetermined increment. According to the above equation, assuming a previous NAK rate of 0.5 and 1/N equal to 0.01, if a frame is received without error, the Current Frame Status is equal to 0, and the current NAK rate becomes $(99/100)*0.5=0.495$. If the next frame received is not received correctly, the Current Frame Status is 1, and the current NAK rate becomes $(99/100)*0.495+(1/100)=0.5001$.

In any of the above descriptions, once the NAK rate has been determined, the number of NAKs transmitted each time a frame is received in error, n, can now be calculated. For example, if the NAK rate becomes greater than one of a number of predetermined thresholds, the number of NAKs transmitted each time a frame is received in error, n, could increase accordingly. Similarly, as the NAK rate falls below each of the predetermined thresholds, the number of NAKs transmitted each time a frame is received in error, n, could decrease.

The two embodiments discussed above reduce the delay in audio information transmission through transmitting multiple NAKs when a data frame is received in error. This is to avoid a repeated retransmission requesting process. To reduce the delay to a minimum, in an alternative embodiment, no retransmission request is sent by the wireless communication device upon receipt of a frame received in error. In this embodiment, voice latency is reduced to a minimum at the expense of reduced voice quality. However, the reduction in voice quality is usually imperceptible, even with large numbers of frames received in error.

What has been described thus far is the retransmission scheme of the present invention with respect to the forward link, that is, data transmission from BTS 12 to mobile unit 10. In that discussion, the mobile unit requests multiple retransmissions of frames which are received in error from BTS 12. The present invention is also applicable to the reverse link, as will now be discussed. The discussion below focuses on how the mobile unit retransmits frames when requested to do so by a second transceiver, such as BTS 12.

In the reverse link (transmission between mobile unit 10 and BTS 12), mobile unit 10 transmits data frames containing audio information to BTS 12, similar to the forward link, described above. In this case, referring again to FIG. 2, transmitter 50 is located within mobile unit 10 and receiver 52 is located within BTS 12.

When a data frame containing audio information is initially received in error at BTS 12, a single NAK is sent to mobile unit 10, in accordance with IS-707, requesting a single retransmission of the frame which was received in error. The identity of the bad frame, or error frame, is accomplished in the same way in which the forward link operates, using SEQ number 72.

When mobile unit 10 receives the single NAK from BTS 12, in accordance with the present invention, mobile unit 10 immediately re-transmits multiple copies of the frame which is identified in the NAK. This action is inapposite to a typical mobile unit operating under the IS-707 standard, in which a mobile unit sends only 1 retransmission for each NAK received.

The multiple frames sent by mobile unit 10 in response to a NAK sent by BTS 12 may be a fixed number or a variable number. In the exemplary embodiment, a fixed number of frames equal to three is immediately transmitted, although a greater or lesser number of frames could be transmitted in the alternative. In a variable repetition system, the number of frames re-transmitted upon receiving a NAK varies, depending on the channel quality, which can be measured by determining the NAK rate, discussed previously. In other embodiments, the channel quality may be determined by other criteria, such as the power level at which a mobile unit is transmitting, or a combination of criteria. As the channel quality improves, fewer frame retransmissions are theoretically necessary. As the channel quality degrades, more frame retransmissions should be necessary to ensure a successful retransmission.

Figure 4:
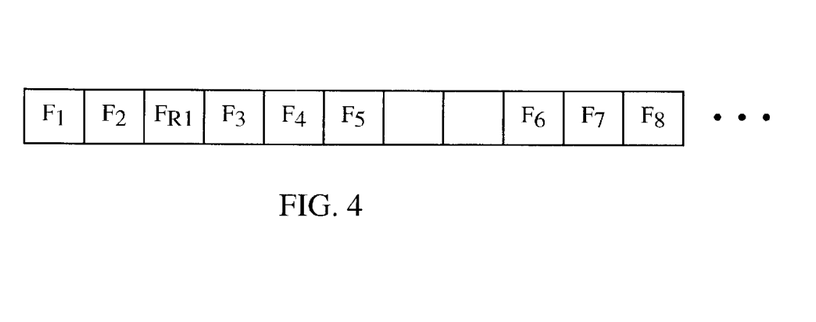
FIG. 4 illustrates a sequence of data frames being transmitted.

The multiple frames sent by a mobile communication device in response to a NAK are transmitted generally in close succession to each other, either by sending frames in immediate succession or by interleaving the retransmission frames with 'normal' data frames (new frames which have not yet been transmitted) in order to gain time diversity. In an alternative embodiment, to avoid delaying the transmission of normal data frames in either scenario, the multiple frames in response to a NAK are retransmitted in a two part process. The frame of the multiple frames to be retransmitted is transmitted immediately upon receipt of a NAK. The remaining frames are transmitted only when there are no further normal frames awaiting transmission. Control system 54 determines the existence of empty time slots. In this embodiment, normal frames are not unnecessarily delayed by the retransmission process. FIG. 4 illustrates this concept.

In FIG. 4, frames are represented as time slots, the frames being transmitted as shown from left to right. Normal frame $F_1$, is first transmitted, followed by normal frame $F_2$. Prior to the third normal frame being transmitted, a NAK is received by the mobile communication device, requesting that frame $F_{R1}$ be retransmitted. The mobile communication device inserts retransmission frame $F_{R1}$ as the third frame to be transmitted, displacing frame $F_3$, which normally would have been the third frame transmitted. This displacement causes a small delay in the audio information being transmitted. Normal frame $F_3$ is then transmitted immediately following $F_{R1}$ followed by normal frames $F_4$ and $F_5$. Following frame $F_5$, no further normal data awaits to be transmitted, allowing excess capacity to exist in the transmission stream. In this embodiment of the present invention, frame $F_{R1}$ is then transmitted in the time slot immediately following normal frame $F_5$. This allows multiple retransmissions to occur without introducing additional delays into the transmission stream.

In a slight variation to the above embodiment, if no empty time slots become available after a predetermined time period after the first retransmission frame $F_{R1}$ is transmitted, no further retransmissions of that frame are attempted.

Figure 5:
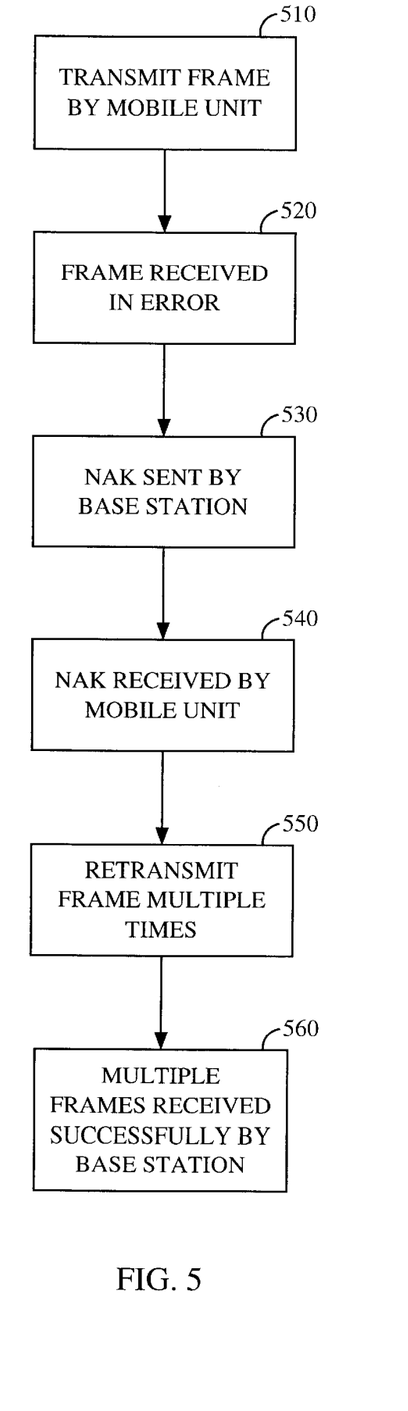
FIG. 5 is a flow diagram detailing the operation of the transmitter and the receiver of FIG. 2 during a forward link transmission in accordance with the teachings of the present invention.

In FIG. 5, a flow diagram illustrates the operation of transmitter 50, residing in a fixed station or BTS 12, and receiver 52, residing in mobile unit 10, during a communication performed in accordance with the present invention. FIG. 5 illustrates the operation of mobile unit 10 when a data frame is received in error by BTS 12.

Mobile unit 10 begins the transmission process by transmitting data frame 70 containing audio information to BTS 12, as shown in step 510. Frame 70 comprises SEQ number 72, which identifies frame 70 for retransmission purposes, and is set to the eight least significant bits of index L__V(S).

At step 520, frame 70 is received by BTS 12. However, frame 70 is not received successfully or is received out of order with respect to previously transmitted frames. Such a frame is considered to have been received in error.

At step 530, a single NAK is sent by BTS 12 to mobile unit 10, requesting that mobile unit 10 re-transmit frame 70. The NAK sent by BTS 12 is transmitted in accordance with IS-707 and IS-95 which directs a BTS 12 to send a single NAK the first time a frame is received in error.

At step 540, the NAK is received by mobile unit 10 and demodulated to determine which frame was received in error. SEQ number 72 in frame 70 identifies which frame in buffer 55 is to be re-transmitted. In step 550, control system 54 retrieves frame 70 from buffer 55 and re-transmits it a predetermined number of times n, in the exemplary embodiment n is equal to three. Each re-transmitted frame is identical to the original frame sent. In a second embodiment, the number of frames which are re-transmitted varies in accordance with a predetermined format, which has been described above. In either case, the frames may be transmitted immediately after one another in the transmission stream, interleaved with normal data frames, or interleaved as long as empty time slots exist in the transmission stream, as explained above. In yet another embodiment, NAKs are ignored and no retransmissions occur.

In step 560, each re-transmitted frame is received by BTS 12 and demodulated. If any one of the re-transmitted frames is received successfully, any additional retransmitted frames successfully received are ignored. The probability that one of the re-transmitted frames will be successfully received increases dramatically by re-transmitting several frames in close succession to each other. This, in turn, reduces the latency period for re-transmitting audio frames, which is critical to enable audio information using the data protocols of IS-707.

Figure 6:
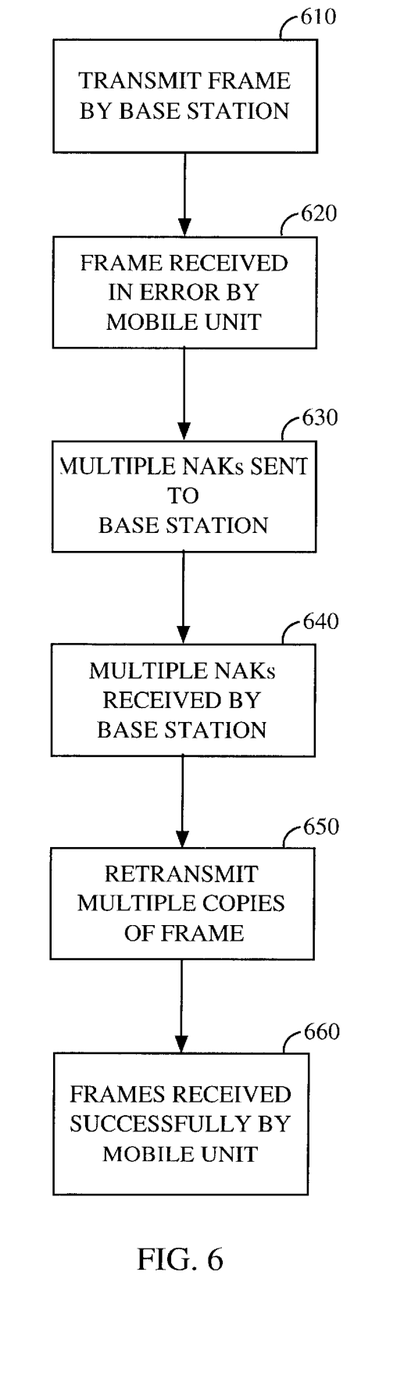
FIG. 6 illustrates the operation of a second transmitter and a second receiver during a reverse link transmission in accordance with the teachings of the present invention.

FIG. 6 illustrates the operation of transmitter 50, residing in mobile unit 10, and receiver 52, residing in BTS 12, during a communication performed in accordance with the present invention. FIG. 6 illustrates the operation of mobile unit 10 when a data frame is unsuccessfully received by mobile unit 10.

BTS 12 begins the transmission process by transmitting data frame 70 containing audio information to mobile unit 10, as shown in step 610. Frame 70 comprises SEQ number 72, which identifies frame 70 for retransmission purposes, and is set to the eight least significant bits of index L__V(S).

At step 620, frame 70 is received by mobile unit 10. However, frame 70 is not received successfully or is received out of order with respect to previously transmitted frames. Such a frame is said to have been received in error.

At step 630, a predetermined number of NAKs, n, are sent by mobile unit 10 to BTS 12, requesting that BTS 12 re-transmit frame 70 one time for each NAK transmitted by mobile unit 10. This is in contrast with present mobile units, which follow the IS-707 protocol and send only one NAK for each frame that is received in error. Each NAK transmitted by mobile unit 10 identifies frame 70 in SEQ number 72, which is the frame that was received in error. In a second embodiment, the number of NAKs that are sent by mobile unit 10 upon receiving an error frame, n, varies in accordance with a predetermined format, which has been described above. In either case, the NAKs may be transmitted immediately after one another in the transmission stream, by being interleaved with normal data frames, or interleaved with normal data frames as long as empty time slots exist in the transmission stream.

At step 640, the multiple NAKs are received by BTS 12 and demodulated to determine which frame was received in error. SEQ number 72 in each NAK identifies which frame in buffer 55 is to be re-transmitted, each NAK identifying the same frame 70. In step 650, control system 54 retrieves frame 70 from buffer 55 and re-transmits it one time for each NAK received, in the exemplary embodiment, three times. Each re-transmitted frame 70 is an identical copy of frame 70 which was originally transmitted.

In step 660, each re-transmitted frame is received by mobile unit 10 and demodulated. If any one of the re-transmitted frames is received successfully, any additional frames successfully received are ignored. Again, the probability that one of the re-transmitted frames will be successfully received increases dramatically by re-transmitting identical frames several times in close succession to each other.

The preferred embodiments of the present invention have thus been shown and described. It would be apparent to one of ordinary skill in the art, however, that numerous alterations may be made to the embodiments herein disclosed without departing from the spirit or scope of the invention. Therefore, the present invention is not to be limited except in accordance with the following claims.

We claim:

1. Method for efficient data retransmission in a voice-over-data communication system between a first wireless communication device and a second wireless communication device, said first wireless communication device comprising a first transmitter and a first receiver, said second wireless communication device comprising a second transmitter and a second receiver, comprising the steps of:

transmitting a frame of data by said first transmitter in accordance with a preexisting data transmission protocol, said frame comprising audio information;

receiving said frame by said second receiver in accordance with said preexisting data transmission protocol;

transmitting a negative-acknowledgement message (NAK) by said second transmitter in accordance with said pre-existing data transmission protocol if said frame was received in error by said second receiver, said NAK identifying said frame;

receiving said NAK by said first receiver; and transmitting n copies of said frame by said first transmitter in response to said NAK, each of said copies transmitted in close succession to each other, wherein n is independent of the number of times said frame has been received in error, wherein transmitting n copies of said frame comprises the steps of:

immediately transmitting a first copy of said frame; and transmitting a second copy of said frame only if an empty time slot occurs within a predetermined time period after said first copy is transmitted.

2. Method of claim 1 wherein the step of transmitting n copies of said frame comprises the step of transmitting a fixed number of copies of said frame in response to said NAK.

3. Method of claim 1 wherein the step of transmitting n copies of said frame comprises the step of transmitting a variable number of copies of said frame in response to said NAK.

4. Method of claim 3 wherein the step of transmitting a variable number of copies of said first data frame comprises the steps of:

determining a channel quality; and transmitting n copies of said frame based upon said channel quality.

5. Method of claim 4 wherein the step of determining said channel quality comprises the step of determining a NAK rate associated with said channel.

6. Method of claim 5 wherein the step of determining said NAK rate comprises the steps of:

determining a total number of frames received by said first receiver;

determining a number of frames received in error by said first receiver;

determining said NAK rate by dividing said number of frames received in error by said total number of frames received when said total number of frames received is equal to a predetermined number;

comparing said NAK rate to at least one predetermined threshold; and increasing n each time said NAK rate exceeds one of said thresholds and decreasing n each time said NAK rate falls below one of said predetermined thresholds.

7. Method of claim 5 wherein the step of determining said NAK rate comprises the steps of:

determining a total number of frames transmitted by said first transmitter;

determining a number of NAKs transmitted by said first transmitter;

determining said NAK rate by dividing said number of NAKs transmitted by said total number of frames transmitted when said total number of frames transmitted is equal to a predetermined number;

comparing said NAK rate to at least one predetermined threshold; and increasing n each time said NAK rate exceeds one of said thresholds and decreasing n each time said NAK rate falls below one of said predetermined thresholds.

8. Method of efficient data retransmission in a voice-over-data communication system between a first wireless communication device and a second wireless communication device, said first wireless communication device comprising a first transmitter and a first receiver, said second wireless communication device comprising a second transmitter and a second receiver, comprising the steps of:

transmitting a frame by said second transmitter in accordance with a pre-existing data transmission protocol, said frame comprising audio information;

receiving said frame by said first receiver;

determining whether or not said frame was received in error by said first receiver; and transmitting n negative-acknowledgement messages (NAKs) by said first transmitter if said frame was received in error, each of said NAKs transmitted in close succession to each other, wherein n is independent of the number of times said frame has been received in error, wherein the step of transmitting n NAKs comprises the steps of:

immediately transmitting a first NAK identifying said frame; and transmitting a second NAK identifying said frame only if an empty time slot occurs within a predetermined time period after said first NAK is transmitted.

9. Method of claim 8 wherein the step of transmitting n NAKs comprises the step of transmitting a fixed number of NAKs if said frame was received in error.

10. Method of claim 9 wherein said fixed number of NAKs is equal to zero.

11. Method of claim 8 wherein the step of transmitting n NAKs comprises the step of transmitting a variable number of NAKs if said frame was received in error.

12. Method of claim 11 wherein the step of transmitting a variable number of NAKs comprises the steps of:

determining a channel quality; and transmitting n NAKs based upon said channel quality.

13. Method of claim 12 wherein the step of determining said channel quality comprises the step of determining a NAK rate associated with said channel.

14. Method of claim 13 wherein the step of determining said NAK rate comprises the steps of:

determining a total number of frames received by said first receiver;

determining a number of frames received in error by said first receiver;

determining said NAK rate by dividing said number of frames received in error by said total number of frames received when said total number of frames received is equal to a predetermined number;

comparing said NAK rate to at least one predetermined threshold; and increasing n each time said NAK rate exceeds one of said thresholds and decreasing n each time said NAK rate falls below one of said predetermined thresholds.

15. Method of claim 13 wherein the step of determining said NAK rate comprises the steps of:

determining a total number of frames transmitted by said first transmitter;

determining a number of NAKs transmitted by said first transmitter;

determining said NAK rate by dividing said number of NAKs transmitted by said total number of frames transmitted when said total number of frames transmitted is equal to a predetermined number;

comparing said NAK rate to at least one predetermined threshold; and increasing n each time said NAK rate exceeds one of said thresholds and decreasing n each time said NAK rate falls below one of said predetermined thresholds.

16. Apparatus for efficient data retransmission in a voice-over-data communication system between a first wireless communication device and a second wireless communication device, said first wireless communication device comprising a first transmitter and a first receiver, said second wireless communication device comprising a second transmitter and a second receiver, comprising:

said first receiver having means for receiving a negative-acknowledgement message (NAK) transmitted by said second transmitter in accordance with a pre-existing data transmission protocol, said NAK identifying a frame received in error by said second receiver; and said second transmitter for transmitting n copies of said frame in response to said NAK, each of said copies transmitted in close succession to each other, wherein n is independent of the number of times said frame has been received in error, wherein said second transmitter comprises:

means for immediately inserting a first copy of said frame into a transmission stream; and means for determining the occurrence of an empty time slot in said transmission stream and for filling said empty time slot with a second copy of said frame.

17. Apparatus for efficient data retransmission in a voice-over-data communication system between a first wireless communication device and a second wireless communication device, said first wireless communication device comprising a first transmitter and a first receiver, said second wireless communication device comprising a second transmitter and a second receiver, comprising:

said first receiver having means for receiving a negative-acknowledgement message (NAK) transmitted by said second transmitter in accordance with a preexisting data transmission protocol, said NAK identifying a frame received in error by said second receiver; and said second transmitter for transmitting n copies of said frame in response to said NAK, each of said copies transmitted in close succession to each other, wherein n is independent of the number of times said frame has been received in error;

means for determining a channel quality comprising means for determining a rate at which NAKs are transmitted by said first transmitter; and means for varying n based on said channel quality.

18. Apparatus for efficient data retransmission in a voice-over-data communication system between a first wireless communication device and a second wireless communication device, said first wireless communication device comprising a first transmitter and a first receiver, said second wireless communication device comprising a second transmitter and a second receiver, comprising:

said first receiver having means for receiving a negative-acknowledgement message (NAK) transmitted by said second transmitter in accordance with a pre-existing data transmission protocol, said NAK identifying a frame received in error by said second receiver; and said second transmitter for transmitting n copies of said frame in response to said NAK, each of said copies transmitted in close succession to each other, wherein n is independent of the number of times said frame has been received in error;

means for determining a channel quality comprising means for determining a rate at which NAKs are received by said first receiver; and means for varying n based on said channel quality.

19. Apparatus of claim 17 wherein said means for varying n comprises:

comparator means for comparing said channel quality to at least one predetermined threshold; and means for increasing n if said channel quality exceeds at least one of said predetermined thresholds and for decreasing n if said channel quality falls below at least one of said predetermined thresholds.

20. Apparatus for efficient data retransmission in a voice-over-data communication system between a first wireless communication device and a second wireless communication device, said first wireless communication device comprising a first transmitter and a first receiver, said second wireless communication device comprising a second transmitter and a second receiver, comprising:

said first receiver for receiving a frame in accordance with a pre-existing data transmission protocol;

means for detecting if said frame was received in error; and said first transmitter for transmitting n NAKs if said frame was received in error, each of said NAKs transmitted in close succession to each other, wherein n is independent of the number of times said frame has been received in error, wherein said first transmitter comprises:

means for immediately inserting a first NAK identifying said frame into a transmission stream; and means for determining the occurrence of an empty time slot in said transmission stream and for filling said empty time slot with a second NAK identifying said frame.

21. Apparatus of claim 20 further comprising:

means for determining a channel quality; and means for varying n based on said channel quality.

22. Apparatus of claim 21 wherein said means for determining said channel quality comprises means for determining a rate at which NAKs are transmitted by said first transmitter.

23. Apparatus of claim 21 wherein said means for determining said channel quality comprises means for determining a rate at which NAKs are received by said first receiver.

24. Apparatus of claim 21 wherein said means for varying comprises:

comparator means for comparing said channel quality to at least one predetermined threshold; and means for increasing n if said channel quality exceeds at least one of said predetermined thresholds and for decreasing n if said channel quality falls below at least one of said predetermined thresholds.

* * * * *